United States Patent Office 3,737,441
Patented June 5, 1973

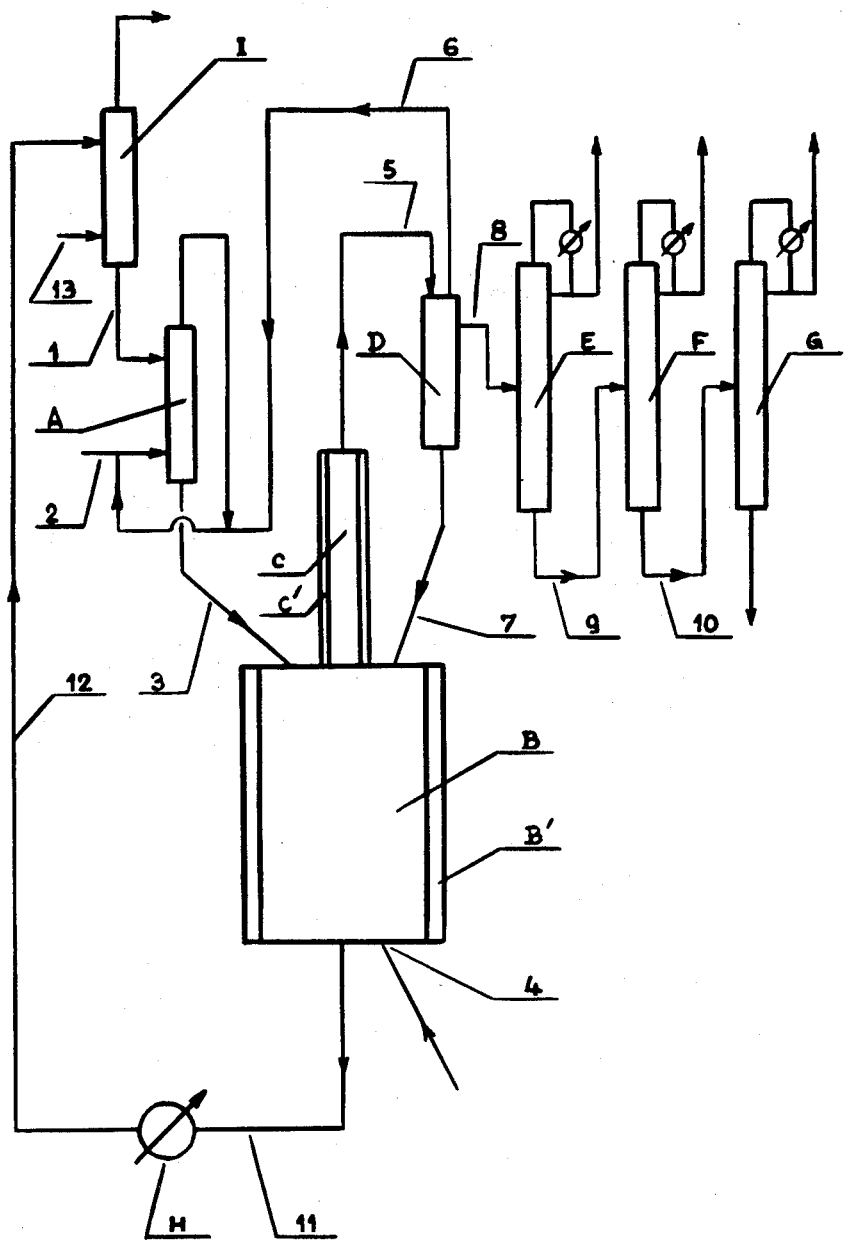

3,737,441
PROCESS FOR THE PREPARATION OF METHYL VINYL KETONE AND 2,5-DIHYDROFURAN
Bernard Charavel, Aubagne, France, assignor to Produits Chimiques Pechiney-Saint-Gobain, Neuilly-sur-Seine, France
Filed Dec. 17, 1968, Ser. No. 784,438
Claims priority, application France, Dec. 20, 1967, 133,052
Int. Cl. C07d 5/08, 45/04
U.S. Cl. 260—346.1 R    4 Claims

ABSTRACT OF THE DISCLOSURE

The preparation of methyl vinyl ketone and 2,5-dihydrofuran by oxidation of butadiene alone or in combination with butene-1 by first forming a complex of the olefinic compound with the mercuric salt and then heating the complex to an elevated temperature within the range of 90° to 100° C.

---

This invention relates to a process for the preparation of methyl vinyl ketone and 2,5-dihydrofuran by oxidation of butadiene-1,3 by means of mercuric salts.

Olefins or diolefins, especially butadiene, have previously been oxidized by means of mercuric salts. In the process for carrying out such oxidation, where the diolefin is butadiene, it has not been posible to isolated oxidation products of butadiene other than diacetyl.

It is an object of this invention to provide a process for oxidation of butadiene-1,3 by means of mercuric salts wherein, in addition to the diacetyl, substantial amounts of methyl vinyl ketone and 2,5-dihydrofuran can be produced and isolated.

In accordance with the practice of this invention, the process for the preparation of methyl vinyl ketone and 2,5-dihydrofuran consists in first forming an aqueous solution of a mercuric salt-butadiene-1,3 complex by absorption of a mercuric salt of butadiene-1,3 in the presence of water, decomposing the complex in solution in aqueous medium by heating to a temperature within the range of 90° to 100° C., carrying off the oxidation products of butadiene-1,3 progressively with their formation by means of a carrier gas which is inert to the reaction medium through a substantially enclosed space maintained at a fairly constant temperature within the range of 60° to 70° C., and then separating such as by fractionating the said oxidation products of butadiene-1,3.

The absorption of mercuric salts by butadiene-1,3 can be achieved in a well known manner at room temperature by the use of an absorber, preferably fitted with agitation means such as a stirrer. Representative of mercuric salts that can be used in the practice of this invention are mercuric nitrate, perchlorate, acetate, and preferably mercuric sulfate. It is believed that the basic sulfate, corresponding to the formula $SO_4Hg \cdot 2HgO$, suspended in the reaction medium at the beginning of the absorption stage, passes into solution progressively as the absorption takes place.

For best practice of the invention, the absorption of mercuric salts by butadiene-1,3 is carried out with 1 mol mercuric salt per ½ mol butadiene-1,3. The inert carrier gases which are employed for carrying off the oxidation products of butadiene-1,3 formed by the thermal decomposition of the mercuric salts-butadiene-1,3 complex can be represented by nitrogen and helium.

The decomposition of the mercuric salt-butadiene-1,3 complex causes the formation of mercurial sludges in conjunction with the oxidation products of butadiene-1,3. These mercurial sludges, made up essentially of mercurous salts and metallic mercury can be regenerated into mercuric salts in a known manner, as by oxidation in the presence of a mixture of oxygen and ozone. The regeneration step can be carried out, for instance, by circulation of the mercurial sludges in countercurrent flow with a mixture of oxygen and ozone through a reaction column.

The substantially enclosed space through which the oxidation products of butadiene-1,3 formed by thermal decomposition of mercuric salt-butadiene-1,3 complex are carried off is preferably made up of a column equipped with a double jacket for circulation of a thermoregulated fluid therethrough to maintain the column at a fairly constant temperature within the range of 60° to 70° C.

The separation of the oxidation products of butadiene-1,3 can be carried out by means of a separator communicating with the exit of the substantially enclosed spaced and maintained at a temperature of about 0° C. The separator permits the separation of the oxidation products of butadiene-1,3 from the water carried off with the carrier gas and from unreacted butadiene-1,3. The oxidation products of butadiene-1,3, essentially made up of 2,5-dihydrofuran, methyl vinyl ketone, diacetyl and crotonaldehyde, are then respectively separated by fractional distillation.

In accordance with one modification for carrying out the process of this invention, the different operations can be carried out by continuously driving the butadiene oxidation products out of the reaction zone, as they are formed, by continuously recycling unreacted butadiene and by continuous regeneration of mercurial sludges resulting from the mercuric salt-butadiene-1,3 complex.

A second variation in the process of this invention, applicable to the instance wherein it is desired to obtain higher yields of 2,5-dihydrofuran, consists in carrying out the decomposition of the mercuric salt-butadiene-1,3 complex in the presence of a mercuric salt-butene-1 complex. This variation can be practiced by preparing a mercuric salt-butadiene-1,3 complex in the presence of an excess of mercuric salt, allowing the unconverted mercuric salt to be absorbed by an equimolecular quantity of butene-1 and then thermally decomposing the aqueous complex composition formed, the oxidation products of butadiene-1,3 and of butene-1 being driven out of the reaction zone progressively as they are formed. It has been established that butene-1 is oxidized by the mercuric salts with the formation of methyl vinyl ketone by using the four oxidation grades of butene-1. On the other hand, the butadiene-1,3 oxidation of mercuric salts into methyl vinyl ketone and into 2,5-dihydrofuran makes use of only two of the oxidation grades of butadiene-1,3 and thus introduces an excess of mercuric salts. The mercuric salt-butene-1 complex is able to absorb the excess of mercuric salts during its oxidoreduction and, in this way, improves the conversion rate of butadiene-1,3 to 2,5-dihydrofuran.

The following example of the practice of this invention as a continuous operation is given by way of illustration and not by way of limitation, reference being made to the accompanying drawing.

An absorber A is provided with a duct 1 for the introduction of mercuric salt and with a duct 2 for the introduction of butadiene-1,3. A duct 3 connects the lower part of the absorber A with the upper part of reactor B for the passage of the complex formed in the absorber A to the reactor B. The reactor B is formed with a double jacket B′ through which a thermoregulated fluid can be circulated and it is provided with a stirrer or other agitator (not shown) in its lower portion. The reactor B has an inlet connecting branch 4 for the introduction of the carrier gas. Reactor B is surmounted by a column C which is also provided with a double jacket C′ through which a thermoregulated fluid may be circulated. The column C is connected by duct 5 to a separator D.

Separator D is connected through a duct 6 which communicates the upper end of the separator with the lower portion of the absorber A and through which unreacted butadiene is recycled after passing through a condenser (not shown). Duct 7 communicates the lower portion of the separator D with the upper end portion of the reactor B for recycling water carried off by the carrier gas. Duct 8 communicates the separator D with the first of a series of distillation columns E, F and G.

The distillation columns E, F and G, interconnected through ducts 9 and 10, respectively, permit the separation of the 2,5-dihydrofuran, methyl vinyl ketone and diacetyl respectively from the heads of the columns. The croton-aldehyde is collected at the bottom of column G.

A duct 11 communicates the lower portion of the reactor B with a packed column I and permits the transport of mercurial sludges from the lower portion of the reactor B to column I after cooling by passage through a heat exchanger H. Column I is provided with a duct 13 for the introduction of ozone and is connected with the absorber A through duct 1 for the transport of the regenerated mercuric salt to the absorber A.

The following examples are given by way of illustration, but not by way of limitation, of the invention:

EXAMPLE 1

118.6 grams (0.4 mol) of mercuric sulfate in one liter of water are introduced into a two liter flask provided with a stop cock. A partial vacuum is drawn in order to promote the intake of butadiene. Butadiene is absorbed by the mercuric sulfate solution until the disappearance of the basic sulfate suspension $HgSO_4 \cdot 2HgO$. 5.2 liters of butadiene, measured at 18° C. under a pressure of 760 mm. Hg, are absorbed.

The solution containing the complex is then introduced into a two liter reactor provided with a stirrer and surmounted with a column provided with a double jacket through which a heat exchange fluid can be circulated to maintain the temperature at about 70° C.

The reactor is heated to a temperature of 90° to 100° C. for five hours while bubbling nitrogen gas therethrough to drive out the butadiene-1,3 oxidation products as they are formed with a minimum of entrained water.

The oxidation products issuing from the exit of the column are introduced into the separator D at 0° C. and dried on magnesium sulfate. The unreacted butadiene is condensed at a temperature between —40° and —50° C.

5 grams of mixture of oxidation products are collected, the composition of which is as follows:

traces of propanal
0.13 g. i.e. 2.6% acetone
0.03 g. i.e. 0.66% acrolein
2 g. i.e. 40% 2,5-dihydrofuran
2.3 g. i.e. 47% methyl vinyl ketone
0.24 g. i.e. 4.8% diacetyl
0.25 g. i.e. 5% croton-aldehyde The total yield is 50% based upon the amount of reacted butadiene.

EXAMPLE 2

118.2 grams (0.4 mol) of mercuric sulfate in one liter of water are introduced into a two liter flask provided with a stop cock. A partial vacuum is drawn to promote the butadiene intake and the butadiene absorption is stopped when 3.2 liters of butadiene, taken at 20° C. under a pressure of 760 mm. Hg, have been absorbed by the mercuric sulfate. The mercuric salt solution is brought to a complete complex formation by absorption of butene-1 up to the point of disappearance of the yellow precipitate. 3.85 liters of butene-1, taken at 20° C. under a pressure of 760 mm. Hg, are absorbed.

The solution, containing the mixture of both olefinic complexes, is introduced into a two liter reactor provided with a stirrer and surmounted by a column having a double jacket through which a heat exchange fluid is circulated for maintaining the temperature at 65° to 70° C.

The reactor is heated to a temperature of 90° to 100° C. for five hours while bubbling nitrogen gas therethrough to drive out, with a minimum of water, the butadiene-1,3 oxidation products. The oxidation products of both olefins, issuing from the exit of the column, are introduced into a separator at 0° C. The unreacted gases are condensed at a temperature within the range of —40° to —50° C.

7.5 grams of a mixture of oxidation products are collected, the composition of which is as follows:

propanal
0.075 g. i.e. 1% acetone
acrolein
0.150 g. i.e. 2% methyl ethyl ketone
1.5 g. i.e. 20% 2,5-dihydrofuran
4.8 g. i.e. 65% methyl vinyl ketone
0.27 g. i.e. 5% diacetyl
0.50 g. i.e. 7% croton-aldehyde The volume of unconverted gas which is collected has the following composition:

butene-1, 54%
butadiene-1,3, 46%

The yield in 2,5-dihydrofuran, based upon the amount of reacted butadiene, is 32%. A normal oxidation reaction of butadiene-1,3 by means of mercuric sulfate gives a yield of only 17% based upon the amount of reacted butadiene.

The total reaction yield is 71% based upon the amount of olefins consumed.

It will be apparent from the foregoing that I have provided a new and improved process for the oxidation of butadiene-1,3 by means of mercuric salts to produce methyl vinyl ketone and 2,5-dihydrofuran as oxidation reaction products.

It will be understood that changes may be made in the details of construction and operation without departing from the spirit of the invention, especially as defined in the following claims.

I claim:
1. A process for the preparation of methyl vinyl ketone and 2,5-dihydrofuran comprising absorbing a mercuric salt with butadiene-1,3 in aqueous medium to form a complex in solution, heating the solution to a temperature within the range of 90° to 100° C. in the presence of a mercuric salt-butene-1 complex to decompose the complexes and separating methyl vinyl ketone and 2,5-dihydrofuran.

2. A process as claimed in claim 1 in which the mercuric salt-butene-1 complex is formed in the presence of the mercuric salt-butadiene-1,3 complex by first forming the complex of a mercuric salt-butadiene-1,3 in the presence of an excess of mercuric salt and then absorbing the excess mercuric salt with a substantially equimolar amount of butene-1.

3. In a process for the preparation of methyl vinyl ketone and 2,5-dihydrofuran in which a mercuric salt is absorbed with butadiene in aqueous medium to form a complex in solution and the solution is heated to a temperature of 90 to 100° C. to decompose the complex to produce methyl vinyl ketone and 2,5-dihydrofuran, the improvement comprising decomposing the complex in the presence of a mercuric salt-butene-1 complex and passing an inert carrier gas through the solution to carry off oxidation products formed, passing the resulting mixture of the oxidation products and the inert carrier gas through a substantially closed zone maintained at a temperature of 60° to 70° C. to minmize the water carried off with the oxidation products and separating the methyl vinyl ketone and the 2,5-dihydrofuran.

4. In the process as claimed in claim 3 in which the mercuric salt-butene-1 complex is formed in the presence of the mercuric salt-butadiene-1,3 complex by first forming the complex of a mercuric salt-butadiene-1,3 in the presence of an excess of mercuric salt and then absorbing the excess mercuric salt with a substantially equimolecular amount of butene-1.

References Cited

UNITED STATES PATENTS

| | | | |
|---|---|---|---|
| 2,398,685 | 4/1946 | Yale et al. | 260—597 |
| 2,623,073 | 12/1952 | Toland | 260—597 |

ALEX MAZEL, Primary Examiner

B. DENTZ, Assistant Examiner

U.S. Cl. X.R.

260—597 R